United States Patent
Robins et al.

(10) Patent No.: US 7,084,918 B2
(45) Date of Patent: Aug. 1, 2006

(54) WHITE EYE PORTRAITURE SYSTEM AND METHOD

(75) Inventors: Mark Nelson Robins, Greeley, CO (US); Heather Noel Bean, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 855 days.

(21) Appl. No.: 10/086,342

(22) Filed: Feb. 28, 2002

(65) Prior Publication Data

US 2003/0160879 A1 Aug. 28, 2003

(51) Int. Cl.
*H04N 5/222* (2006.01)
*G03B 17/00* (2006.01)
*G06K 9/00* (2006.01)

(52) U.S. Cl. .................... 348/333.03; 396/51; 382/117
(58) Field of Classification Search ................ 348/239, 348/333.03; 382/117; 388/46; 396/51, 396/18
See application file for complete search history.

(56) References Cited

U.S. PATENT DOCUMENTS

| | | | |
|---|---|---|---|
| 5,016,282 A * | 5/1991 | Tomono et al. | 382/117 |
| 6,307,954 B1 * | 10/2001 | Suzaki | 382/117 |
| 6,539,100 B1 * | 3/2003 | Amir et al. | 382/117 |
| 6,928,231 B1 * | 8/2005 | Tajima | 386/46 |
| 2002/0070844 A1 * | 6/2002 | Davida et al. | 340/5.53 |

* cited by examiner

*Primary Examiner*—Lin Ye

(57) ABSTRACT

A system for capturing an image when an amount of sclera is visible in a preview image comprises a photosensor configured to detect an image, a memory configured to store at least a sclera setting, a processor configured to determine when at least one face is present in the detected image and further configured to determine an amount of sclera present in the face so that the determined amount of sclera is compared to the sclera setting, and an actuator configured to initiate capture of the detected image such that the detected image is captured when the determined amount of sclera is at least equal to the sclera setting.

15 Claims, 2 Drawing Sheets

WHITE EYE PORTRAITURE SYSTEM AND METHOD

TECHNICAL FIELD

The present invention is generally related to digital camera technology and, more particularly, is related to a system and method for capturing an image when an amount of sclera is visible in a preview image.

BACKGROUND OF THE INVENTION

In digitally based image capturing devices an image or "photograph" of an object is stored in a digital data format in the memory within, or coupled to, the image capturing device. A nonlimiting example of a digital image capturing device is the digital camera that captures still images and/or video images. Unfortunately, it is often difficult to capture the digital image at the precise moment that subjects have their eyes open. This problem is particularly acute when a large number of subjects are being photographed at the same time.

SUMMARY OF THE INVENTION

The present invention provides a system and method for capturing an image when an amount of sclera is visible in a preview image. An embodiment provides for capturing an image, comprising the steps of determining that an image preview includes at least one face, determining an amount of sclera in the face, retrieving a sclera setting, and capturing the image when the determined amount of sclera is at least equal to the sclera setting.

BRIEF DESCRIPTION OF THE DRAWINGS

The components in the drawings are not necessarily to scale to each other. Like reference numerals designate corresponding parts throughout the several views.

DETAILED DESCRIPTION

The present invention provides a system and method for capturing an image when an amount of sclera is visible in a preview image. Sclera is defined herein to be the white portion of an individual's eye visible when the eye is open.

Figure 1:
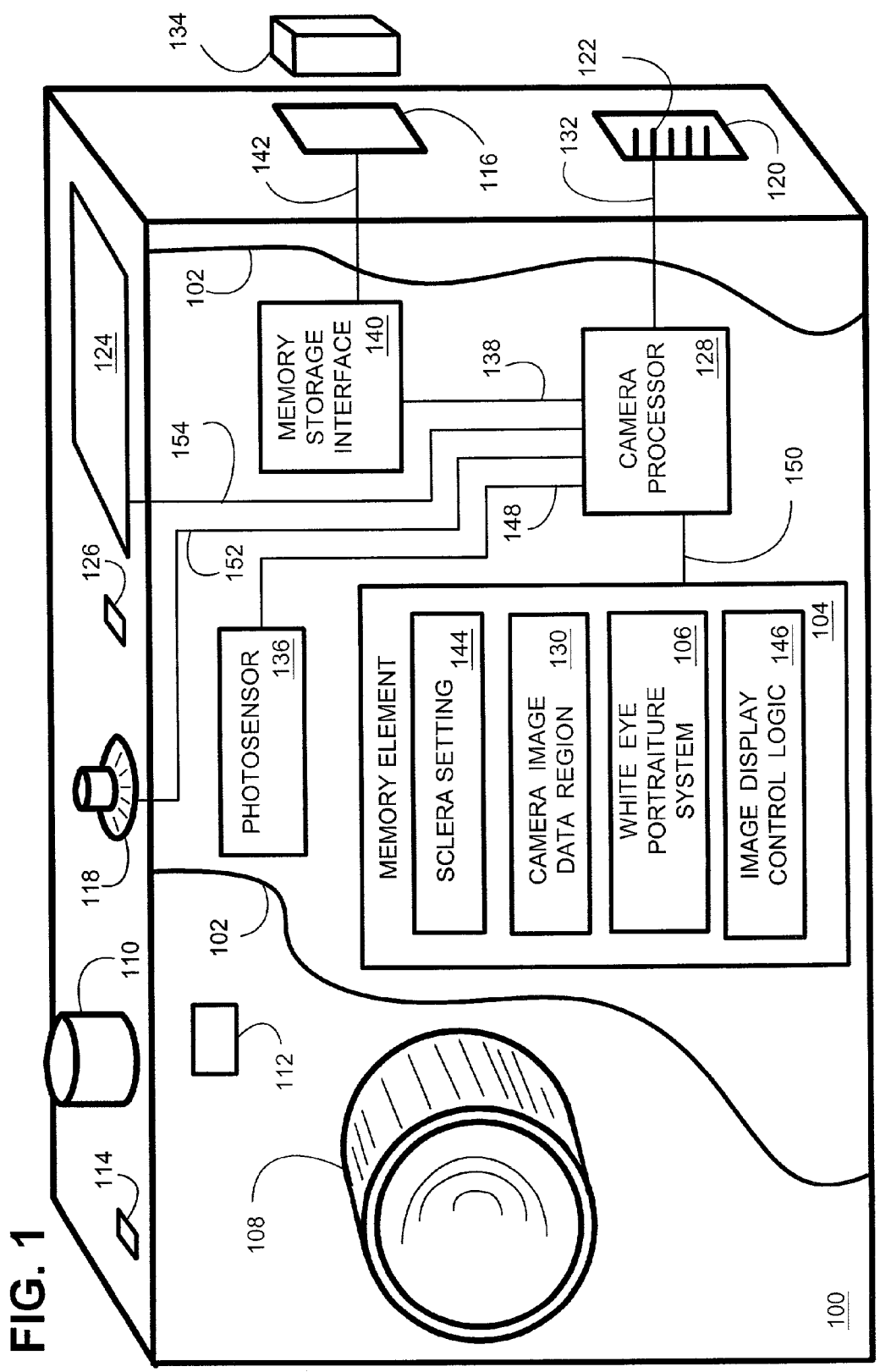
FIG. 1 is a block diagram of an embodiment of a digital camera including external and internal components of the digital camera that includes a memory element storing a white eye portraiture system.

FIG. 1 is a block diagram of one embodiment of a digital camera 100 including a memory element 104 storing a white eye portraiture system 106. Memory element 104 further includes at least regions allocated for the sclera setting 144, image display control logic 146, and the white eye portraiture system 106. External and internal components of the digital camera are separated by cut-away lines 102.

Digital camera 100 includes at least a lens unit 108, an image capture actuation button 110 (or other suitable actuator), a viewing lens 112, a power switch 114, a memory unit interface 116, a sclera specifying device 118, and a plug-in interface unit 120. Plug-in interface unit 120, in one embodiment, includes a plurality of connection pins 122. A display 124 is used for previewing images prior to capturing or for viewing captured images. For convenience of illustration, display 124 is illustrated on the top of digital camera 100.

Operation of the digital camera 100 is initiated by actuation of the power switch 114 or an equivalent device having the same functionality. When digital camera 100 is turned on, display 124 typically remains off so as to conserve limited battery power of the digital camera 100. In one embodiment, actuation of control button 126 turns on display 124 such that the user of digital camera 100 may view an image currently detected through the lens unit 108 on the display 124. This current image displayed on display 124 is referred to herein as a preview image. Image display control logic 146 is executed by camera processor 128 such that the preview image is displayed.

Lens unit 108 is used for focusing the image on photosensor 136. When the operator has focused the image to be captured and is satisfied with it, the operator actuates the image capture actuation button 110 (also referred to as a shutter button or a shutter release button) to cause the digital camera 100 to record (capture) a digital image, thus "photographing" the image.

In accordance with the present invention, when the white eye portraiture system 106 is executed by processor 128 such that a determination is made that a sufficient amount of sclera is visible in the preview image, as described in greater detail below, digital camera 100 captures the image. Data corresponding to the captured image is stored in the camera data image region 130 of memory element 104.

A personal computer, printer or other processing device (not shown) is typically employed with digital cameras such that digital images captured by the digital camera may be retrieved, processed, printed and/or e-mailed. The personal computer or other processing device includes a wire connector interface (not shown) for communicating with digital camera 100 via plug-in interface unit 120. The wire connector interface couples digital camera 100 and the personal computer by mating a wire connector (not shown) having a suitable plug-in attachment with plug-in interface 120. Other embodiments employ a wireless interface or a card-based interface. By providing suitable instructions to the personal computer, other processing device, and/or camera processor 128, the captured image data is transferred from the camera image data region 130, via connection 132, into the personal computer or other processing device for further processing.

In another embodiment, digital image data is stored in memory module unit 134. Memory module unit 134 is a module of memory configured to couple to digital camera 100 via memory unit interface 116. Accordingly, digital image data is transferred to the personal computer or other processing device using memory module unit 134. When the white eye portraiture system 106 is executed by processor 128, in response to actuation of the image capture actuation button 110, such that a determination is made that a sufficient amount of sclera is visible in the preview image, as described in greater detail below, digital camera 100 captures the image. Data corresponding to the captured image is stored in memory module unit 134. In one embodiment, memory storage interface 140 configures the digital image data into a suitable format for transference to the memory module unit 134, via connection 142. In another embodiment, memory storage interface 140 is not included as the camera processor 128 directly transmits suitably formatted digital image data to the memory module unit 134 via connections 138 and 142 directly.

Digital image data is transferred to the personal computer by removing memory module unit 134 from the digital camera 100 and coupling memory module unit 134 to a personal computer. Typically, a convenient coupling port or interface is provided on the surface of personal computer or other processing device such that memory module unit 134 is directly coupled to the personal computer. Once memory module unit 134 is coupled to the personal computer memory module interface, digital image data is transferred to the personal computer or other processing device.

Cut-away lines 102 demark components residing on the outside surfaces of the digital camera 100 and components residing internally in the digital camera 100. Thus, the control button 126, the sclera specifying device 118, lens unit 108, image capture actuation button 110, power switch 114, memory unit interface 116, plug-in interface 120, and display 124 are recognized as components residing on the surfaces of the digital camera 100.

The internal components of digital camera 100 are illustrated between the two cut-away lines 102. Internal components of one embodiment of digital camera 100 includes at least a camera processor 128, a photosensor 136, and a memory element 104. Another embodiment of digital camera 100 employing memory module unit 134 includes memory storage interface 140. For convenience, digital camera 100 is illustrated as storing captured image data in the camera image data region 130 of memory element 104 and in the memory module unit 134. In other embodiments, captured image data is stored in either camera image data region 130 or memory module unit 134.

Photosensor 136 is disposed in a suitable position behind the lens unit 108 such that an image (not shown) may be focused onto photosensor 136 for capturing. Photosensor 136 detects an image through lens unit 108 and provides information corresponding to the detected image to camera processor 128, via connection 148. When digital camera 100 is operating in a mode that displays the preview image on display 124, via connection 154, the user of digital camera 100 previews the image to determine if the user wants to "photograph" the detected current image. If so, the user of digital camera 100 actuates image capture actuation button 110 to initiate capture of the image.

When the white eye portraiture system 106 is operating, upon actuation of image capture actuation button 110, the white eye portraiture system 106 analyzes the preview image, described in greater detail below, to determine the amount of sclera present in the preview image. According to the present invention, the white eye portraiture system 106 permits the storing of the preview image into camera image data region 130 only when a sufficient amount of sclera is detected in the preview image. If insufficient sclera is detected, the preview image is not saved. Thus, an image is captured only when a sufficient amount of sclera is detected. That is, when the image includes people looking at the digital camera 100, the image is captured when the people have their eyes open.

In the event that insufficient sclera is detected, image data is again retrieved from the photosensor 136 such that another preview image is analyzed. Since the preview image is the current image sensed by photosensor 136 on a nearly real-time basis, the current preview image analyzed each time at block 208 will be different. The time difference between the current preview image and the previously analyzed image is at least equal to the exposure time that the pixels in photosensor 136 accumulate charge. In one embodiment, a delay is added to the logic of the white eye portraiture system 106 such that a predefined time between analysis of the preview images occurs. Accordingly, one or more preview images are analyzed, and the image is captured when sufficient sclera is detected. Statistically, the individuals being photographed will all, at some point during a very brief period of time, have their eyes open such that a pleasing image of the people is captured (rather than an undesirable image having some, or all, of the people with closed eyes).

In one embodiment, the white eye portraiture system 106 is always operational. In another embodiment, the white eye portraiture system 106 is optional. The optional white eye portraiture system 106 is activated when a user selects an optional white eye portraiture mode of operating the digital camera 100. This selection of the white eye portraiture mode of operating, referred to as arming, may be effected via a menu system shown on display 124. In other embodiments, the user arms the white eye portraiture system 106 via sclera specifying device 118, control button 126 or another specially dedicated controller device, such as a control button, a push-button, a switch or the like.

In one embodiment, a sclera specifying device 118 is included on the exterior of camera 100. When the sclera setting 144 is a variable parameter, the user actuates the sclera specifying device 118 (FIG. 1). The sclera setting 144 is communicated from sclera specifying device 118 to processor 128, via connection 152.

The sclera specifying device 118 may be implemented as any suitable controller device, such as, but not limited to, a calibrated dial, a push-button or the like. Another embodiment employs a menu displayed on display 124 such that the user may specify sclera settings by interfacing with the menu selections using known menu operating devices (not shown) on camera 100.

In one embodiment, the specified sclera setting 144 is stored in memory element 104. In another embodiment, the sclera setting is directly detected from the sclera specifying device 118 (FIG. 1). In another embodiment, described in greater detail below, stores the sclera setting in memory module unit 134.

In yet another embodiment, the sclera setting 144 is a default setting preprogrammed into memory element 104 (or another suitable memory device residing in the digital camera 100, or in memory module unit 134). Thus, the user does not need to understand sclera settings or need to take the effort to specify a sclera setting. Such an embodiment is advantageous in providing a white eye portraiture system 106 that is easy to operate.

The white eye portraiture system 106 is a source program, executable program (object code), script, or any other entity comprising a set of instructions to be performed. When implemented as a source program, then the program is translated via a compiler, assembler, interpreter, or the like, which may or may not be included within memory element 104. Furthermore, the white eye portraiture system 106 can be written in (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada. In the currently contemplated best mode of practicing the invention, the white eye portraiture system 106 employs the C and/or the C++ programming language.

The white eye portraiture system 106 according to the present invention can be implemented in software (e.g., firmware), hardware, or a combination thereof. In one embodiment, the white eye portraiture system 106 is implemented in software, as an executable program, and is executed by the camera processor 128. The camera processor 128 is a hardware device for executing software, particularly that stored in memory element 104. The camera processor 128 can be any custom made or commercially available camera processor, or any other suitable general purpose processor.

The memory element 104 can include any one or combination of volatile memory elements (e.g., random access memory (RAM, such as DRAM, SRAM, SDRAM, etc.) and nonvolatile memory elements (e.g., ROM, hard drive, tape, CDROM, etc.). Moreover, the memory element 104 may incorporate electronic, magnetic, optical, and/or other types of storage media. Note that the memory element 104 can have a distributed architecture, where various components are situated remote from one another, but can be accessed by the camera processor 128.

When the white eye portraiture system 106 is implemented in software, the white eye portraiture system 106 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The white eye portraiture system 106 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic, compact flash card, secure digital card, or the like), flash memory, a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical) or other suitable memory.

In an alternative embodiment, where the white eye portraiture system 106 is implemented in hardware, the white eye portraiture system 106 can implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
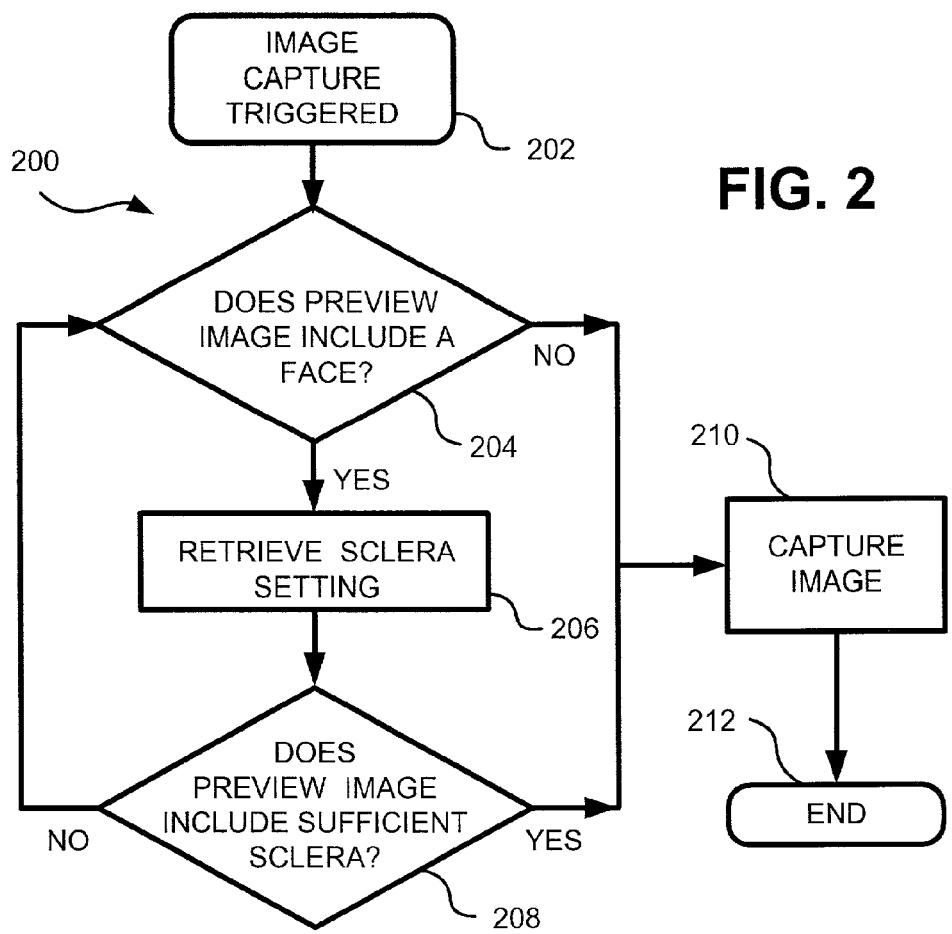
FIG. 2 is a flowchart of an embodiment of the white eye portraiture system of FIG. 1

FIG. 2 is a flowchart 200 of the white eye portraiture system 106 (FIG. 1). The flowchart of FIG. 2 shows the architecture, functionality, and operation of a possible implementation of the white eye portraiture system 106. In this regard, each block represents a module, segment, or portion of code, which comprises one or more executable instructions for implementing the specified logical function(s). It should also be noted that in some alternative implementations, the functions noted in the blocks may occur out of the order noted in FIG. 2. For example, two blocks shown in succession in FIG. 2 may in fact be executed substantially concurrently or the blocks may sometimes be executed in the reverse order, depending upon the functionality involved, as will be further clarified hereinbelow.

At block 202, the white eye portraiture system 106 is armed. The white eye portraiture system 106 may be armed in many ways, including but not limited to, pressing the image capture actuation button 110. The user may press the image capture button 110 when satisfied that the preview image seen through lens 112 and/or on display 124 satisfies subject criteria such as that the subject(s) of the photograph are smiling. In one embodiment, the white eye portraiture system 106 is triggered whenever digital camera 100 is turned on.

In another embodiment, the system is activated when a user selects an optional white eye portraiture mode of operating the digital camera 100. This selection of the white eye portraiture mode of operating, referred to as arming, may be effected via a menu system shown on display 124. In other embodiments, the user arms the white eye portraiture system 106 via sclera specifying device 118, control button 126 or another specially dedicated controller device, such as a control button, a push-button, a switch or the like. After the white eye portraiture system 106 is armed, the process proceeds to block 204.

At block 204, the white eye portraiture system 106 determines whether the preview image includes one or more faces. Exemplary systems for determining whether a preview image includes one or more faces, include, but are not limited to, the systems described in U.S. Pat. Nos. 5,642,431, 5,987,154, and 5,835,616, 5,642,431, 5,987,154, and 5,835,616 are entirely incorporated herein by reference.

U.S. Pat. No. 5,642,431 discloses an exemplary face detection system and method for detecting human faces includes a pattern prototype synthesizer having a preprocessor, an image database, and a prototype generator. The preprocessor normalizes and filters input images. The image database stores face and non-face example patterns. The prototype generator produces face prototypes and non-face prototypes. The face protection system of U.S. Pat. No. 5,642,431 also includes an image classifier having a distance metric processor and a network. The distance metric processor produces a two-value distance measure between the applied image and each of the prototypes. The network processes this distance information to produce a detection signal indicative of whether a face has been detected in the applied image. In one embodiment, the method above is inherently included within block 204.

U.S. Pat. No. 5,987,154 discloses a system and method for detecting people in images. The system and method of U.S. Pat. No. 5,987,154 includes obtaining the difference between one image and a previous image to extract regions of motion; comparing local curvature extremes at the boundary of motion regions with a stored model of a human head; and identifying the local boundary corresponding to the model of the human head. In one embodiment, the method above is inherently included within block 204.

U.S. Pat. No. 5,835,616 describes a two-step process for automatically finding a human face in an electronically digitized image, and for confirming the existence of the face by examining facial features. Step 1 is to detect the human face and is accomplished in stages that include enhancing the digital image with a blurring filter and edge enhancer in order to better set forth the unique facial features such as wrinkles, and curved shapes of a facial image. After prefiltering, preselected curves sometimes referred to as snakelets are dropped on the image where they become aligned to the natural wrinkles and curves of a facial image. Step 2 is to confirm the existence of the human face in seven stages by finding facial features of the digital image encompassing the chin, sides of the face, virtual top of the head, eyes, mouth and nose of the image. Ratios of the distances between these found facial features can be compared to previously stored reference ratios for recognition. In one embodiment, these steps are inherently included within block 204 of the white eye portraiture system 106 and are not described in detail in FIG. 2 for convenience.

Thus, at block 204, if the white eye portraiture system 106 determines that the preview image includes one or more faces, the process proceeds to block 206. If the white eye portraiture system 106 determines the preview image does not include one or more faces, the process proceeds to block 210. At block 210, digital camera 100 captures the preview image. The captured image data corresponding to the captured image may be saved in camera image data region 130 or in memory module unit 134, depending upon the embodiment of digital camera 100.

At block 206, a sclera setting 144 is retrieved. As described above, the sclera setting 144 in one embodiment is a variable setting indicating an amount or a percentage of sclera in the faces of the preview image that should be present before the image is captured. In a simple non-limiting example where the preview image includes one face and the sclera setting 144 is specified at 80 percent, the white eye portraiture system 106 allows the image to be captured when the white eye portraiture system 106 determines that the preview image includes at least 80 percent of the sclera that the white eye portraiture system 106 expects to be present in the preview image if the subject(s) in the preview image all have sufficiently wide-open eyes.

At block 208, the white eye portraiture system 106 determines whether the preview image has sufficient sclera present based on the sclera setting of block 206. Systems and methods for determining whether a preview image includes sclera, include, but are not limited to the systems described in U.S. Pat. No. 5,432,866, entirely incorporated herein by reference. Accordingly, in one embodiment, such a method or an equivalent method is inherently included within block 208. When the preview image includes sufficient sclera (the YES condition), the process proceeds to block 210. The process then ends at block 212.

U.S. Pat. No. 5,432,866 discloses a method for detecting eye structure and its apparatus. The method examines an image having an eye and its vicinity of a human face photographed from the vertex to the jaws to detect an area positioned between a position where brightness changes from lightness to darkness and a position where brightness changes from lightness to darkness and then to lightness, and detects from the above area an area whose width is larger than the pupil's width and where an average of brightness values in the above area is darkest as the upper eyelid area.

And, the inner canthus, outer canthus and their adjacent upper eyelid line are detected by finding the darkest point on the above image to detect the inner canthus and outer canthus points and their adjacent dot groups which become candidates for the upper eyelid line, and by carrying out the logical OR between the above upper eyelid area and the above dot groups. Accordingly, in one embodiment, such a method or an equivalent method is inherently included within block 208.

However, if at block 208, sufficient sclera is not present (the NO condition), the process returns to block 204 such that the current preview image is again analyzed. Since the preview image is the current image sensed by photosensor 136 on a nearly real-time basis, the current preview image analyzed each time at block 208 will be different. The time difference between the current preview image and the previously analyzed image is at least equal to the exposure time that the pixels in photosensor 136 accumulate charge. In one embodiment, a delay is added to the logic of the white eye portraiture system 106 such that a predefined time between analysis of the preview images occurs.

Thus, if a face is detected, but sufficient sclera is not indicated, the image will not be captured by the camera 100. When sufficient sclera is detected, the digital camera 100 captures the image. Accordingly, the logical loop of blocks 204, 206 and 208 is repeated such that one or more preview images are analyzed until a sufficient amount of sclera is detected at block 208. Eventually, sufficient sclera is detected at block 208 or the preview image no longer includes a face at block 204. Accordingly, the image is captured. In another embodiment, release of the image capture actuation button 110 causes the process to immediately proceed to block 212 and end.

Figure 3:
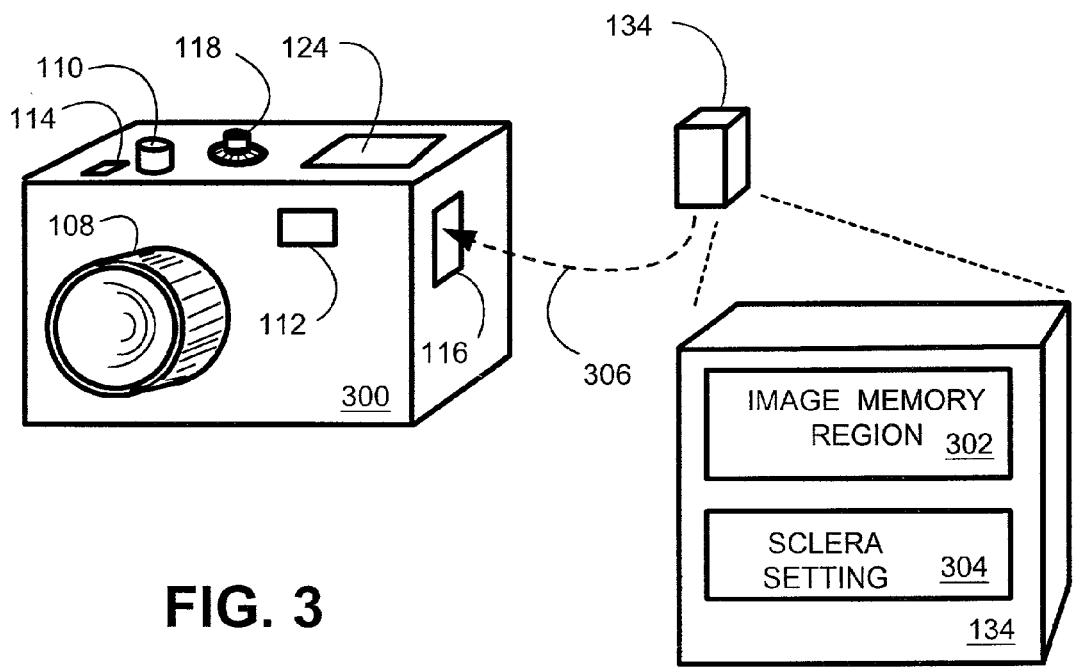
FIG. 3 is a block diagram of an embodiment according to the present invention storing the sclera setting on a memory module unit.

FIG. 3 is a block diagram of an embodiment according to the present invention storing the sclera setting 302 in memory module unit 134. Sclera setting 302 corresponds to the above described sclera setting 144, and accordingly, sclera setting is equally applicable to any of the above described embodiments of the present invention. Thus, when a setting is specified for the amount or the percentage of sclera that must be present before a preview image is saved, the setting is stored as sclera setting 302. When the preview image is saved in accordance with the present invention, the preview image is stored into the image memory region 304. Such storing of the sclera setting 302 and captured images in the image memory region 304 is permitted when the memory module unit 134 is coupled to digital camera 100 by inserting memory module unit 134 into the memory unit interface 116, as indicated by the path of insertion 306 (illustrated by the dash-arrowhead line).

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method for capturing an image, comprising the steps of:
    specifying a user-adjustable sclera setting corresponding to a threshold amount of sclera desored to be present on a captured image with respect to faces in the captured image;
    storing the sclera setting in a memory;
    determining that an image preview includes faces;
    determining an amount of sclera in the image preview associated with each of the faces;
    retrieving a sclera setting; and
    capturing the image when the determined amount of sclera of each of the faces in the image preview is at least equal to the sclera setting.

2. The method of claim 1, wherein the step of retrieving the sclera setting further comprises the step of retrieving a default sclera setting.

3. The method of claim 1, further comprising the step of arming a white eye portraiture program such that the steps of determining, determining an amount of sclera, retrieving and capturing is performed only when the white eye portraiture program is armed.

4. The method of claim 1, wherein the amount of sclera is expressed as a percentage of sclera expected in the face.

5. A system for capturing digital images, comprising:
a photosensor configured to detect an image;
a memory configured to store a user-adjustable sclera setting corresponding to a threshold amount of sclera desired to be present in a captured image with respect to faces in the captured image;
a processor configured to determine when at least one face is present in the detected image, and further configured to determine an amount of sclera present in each said face so that the determined amount of sclera is compared to the sclera setting with respect to each said face; and
an actuator configured to initiate capture of to detected image such that the detected image is captured when the determined amount of sclera with respect to each said face is at least equal to the sclera setting.

6. The system of claim 5, further comprising a sclera specifying device such that the sclera setting is specified through the sclera specifying device.

7. The system of claim 6, wherein the sclera setting specified by the sclera specifying device is stored in the memory.

8. The system of claim 6, wherein the sclera setting is detected from the sclera specifying device.

9. The system of claim 5, further comprising a predefined, default sclera setting such that the default sclera setting is specified by the predefined sclera setting unless an input corresponding to a user-adjustment of the sclera setting is received.

10. The system of claim 5, wherein the amount of sclera is expressed as a percentage of sclera expected in the face.

11. The system of claim 5, further comprising an arming controller configured to arm a white eye portraiture program such that the image is captured only when the white eye portraiture program is armed.

12. The system of claim 11, wherein the arming controller comprises a display screen and a menu program such that the arming controller is armed by executing the menu program.

13. The system of claim 11, wherein the arming controller comprises a control button such that the arming controller is armed by actuating the control button.

14. The system of claim 11, wherein the arming controller comprises a sclera specifying device such that the arming controller is armed by actuating the sclera specifying device and such that the sclera setting is specified according to a setting of the sclera specifying device.

15. The system of claim 5, further comprising means for arming a white eye portraiture program such that the image is captured only when the white eye portraiture program is armed.

* * * * *

UNITED STATES PATENT AND TRADEMARK OFFICE
CERTIFICATE OF CORRECTION

| | | |
|---|---|---|
| PATENT NO. | : 7,084,918 B2 | Page 1 of 1 |
| APPLICATION NO. | : 10/086342 | |
| DATED | : August 1, 2006 | |
| INVENTOR(S) | : Mark Nelson Robins et al. | |

It is certified that error appears in the above-identified patent and that said Letters Patent is hereby corrected as shown below:

In column 8, line 57, in Claim 1, delete "desored" and insert -- desired --, therefor.

In column 8, line 57, in Claim 1, after "present" delete "on" and insert -- in --, therefor.

In column 8, line 64, in Claim 1, delete "a" and insert -- the --, therefor.

In column 9, line 23, in Claim 5, after "capture of" delete "to" and insert -- the --, therefor.

Signed and Sealed this

Fifth Day of May, 2009

JOHN DOLL
*Acting Director of the United States Patent and Trademark Office*